(12) United States Patent
Biagé

(45) Date of Patent: Apr. 20, 2004
(10) Patent No.: US 6,725,312 B1

(54) BUS ARCHITECTURE FOR HIGH RELIABILITY COMMUNICATIONS IN COMPUTER SYSTEM

(75) Inventor: Daniel Biagé, Hull (CA)

(73) Assignee: CML Versatel Inc., Hull (CA)

( * ) Notice: Subject to any disclaimer, the term of this patent is extended or adjusted under 35 U.S.C. 154(b) by 398 days.

(21) Appl. No.: 09/703,789

(22) Filed: Nov. 2, 2000

(51) Int. Cl.[7] .......................... G06F 13/40; G06F 11/00
(52) U.S. Cl. .................. 710/305; 710/315; 379/221.08; 379/221.11; 370/216; 714/5; 714/10
(58) Field of Search ................................ 710/305–317; 714/5–13; 370/216–228, 241–253; 379/219–221.15

(56) References Cited

U.S. PATENT DOCUMENTS

| | | |
|---|---|---|
| 5,263,139 A | 11/1993 | Testa |
| 5,426,740 A | 6/1995 | Bennett |
| 5,469,577 A | 11/1995 | Eng |
| 5,544,163 A | 8/1996 | Madonna |
| 5,590,284 A | 12/1996 | Crosetto |
| 5,596,569 A * | 1/1997 | Madonna et al. ........... 370/217 |
| 5,676,736 A | 10/1997 | Brady |
| 5,682,484 A | 10/1997 | Lambrecht |
| 5,694,555 A | 12/1997 | Morriss |
| 5,781,747 A | 7/1998 | Smith |
| 5,841,841 A | 11/1998 | Dodds |
| 5,857,084 A | 1/1999 | Klein |
| 5,911,084 A | 6/1999 | Jones |
| 5,915,104 A | 6/1999 | Miller |
| 5,940,443 A | 8/1999 | Weir |
| 5,951,666 A | 9/1999 | Ilting |
| 5,958,032 A | 9/1999 | Manabe |
| 5,974,056 A | 10/1999 | Wilson |
| 5,974,136 A | 10/1999 | Murai |
| 5,999,614 A | 12/1999 | Doshi |
| 6,000,043 A | 12/1999 | Abramson |
| 6,005,841 A | 12/1999 | Kicklighter |
| 6,028,924 A * | 2/2000 | Ram et al. ................... 379/229 |
| 6,038,288 A * | 3/2000 | Thomas et al. .......... 379/15.01 |
| 6,088,329 A * | 7/2000 | Lindberg et al. ............. 370/217 |
| 6,104,803 A * | 8/2000 | Weser et al. ................. 379/230 |
| 6,381,239 B1 * | 4/2002 | Atkinson et al. ........... 370/362 |
| 6,493,353 B2 * | 12/2002 | Kelly et al. .................. 370/467 |
| 6,498,791 B2 * | 12/2002 | Pickett et al. ................ 370/353 |
| 2002/0034194 A1 * | 3/2002 | Young et al. ................ 370/498 |

OTHER PUBLICATIONS

IDPX–1600 System Block Diagram—General Architecture Illustrates the architecture of a legacy product of the assignee.
Compact PCT Systems, May–Jun. 2000, pp. 20–23, article.
Articles from a Bell Northern Research Publication; telesis, issue 95, Dec. 1992, ages 31–41 and pp. 55–63.

* cited by examiner

Primary Examiner—Sumati Lefkowitz
(74) Attorney, Agent, or Firm—Miles & Stockbridge P.C.; Edward J. Kondracki

(57) ABSTRACT

An industrial PC-compatible computer system for telecommunications applications is described. The computer system includes a plurality of peripheral boards, each of which includes a peripheral processor. A computer telephony bus provides communications among the peripheral boards. The computer system also includes a plurality of system processors. A serial telecommunications bus arrangement provides communications between the plurality of peripheral boards and the plurality of system processors. The computer system arrangement providing for greater reliability in the event of a failure of a peripheral board, a system processor or of the communications therebetween.

14 Claims, 8 Drawing Sheets

BUS ARCHITECTURE FOR HIGH RELIABILITY COMMUNICATIONS IN COMPUTER SYSTEM

FIELD OF THE INVENTION

The invention relates generally to the field of computers, and more particularly to the communication buses used for communications within a computer.

BACKGROUND OF THE INVENTION

Communications within a computer take place along pathways known as buses. It can be appreciated that it is difficult, if not impossible, to design a bus that meets all the requirements that might be placed on it regardless of the type of computer with which it is associated. Some of these requirements include high speed, the ability to handle large amounts of data (typically produced by so called 'multimedia' devices), the ability to communicate with devices in remote locations, the ability to provide high reliability communications, compatibility with a large array of peripheral devices and be low cost. This list is by no means exhaustive but it indicates the types of competing, sometimes mutually exclusive requirements placed on buses.

The ISA (Industry Standard Architecture) bus was introduced by IBM in 1984. This 16-bit/8-MHz bus became the industry standard in computers. However, difficulties began to arise when 32 bit processors were introduced. Such processors along with the introduction of peripheral devices that generate large amounts of data made this a narrow and slow means of communication. The increasing requirements placed on buses required that a new, more flexible architecture be introduced.

U.S. Pat. No. 5,263,139, issued on Nov. 16, 1993 to Testa et. al., discloses a multiple bus architecture that allows flexible communications between a processor or processors and other systems. FIG. 1 of this application shows a block diagram representation of such a bus architecture. Multiple buses 106, 108 and 110 are connected to a main system interconnect bus 112. Bus 108 connects the processor(s) 100, bus 106 is, for example, a SCSI bus that connects external devices 102 and bus 110 provides communications for remote devices 104. The patent proposes bus 110 could be an ISDN connection. These buses provide specialized communications for the various systems allowing performance to be optimized for increased data throughput.

The speed of data transfer between the processor and subsystems can be increased by reducing the length of the transmission path i.e. the central processor and peripheral boards are located within a defined, short distance of one another, thereby limiting delays due to transmission length. This idea is the basis for 'local buses'. The current standard in local buses, and buses in general, is the Peripheral Component Interconnect (PCI) bus. The PCI bus is a local bus that was introduced by Intel in 1991. The specifications of a PCI bus can be found in the Peripheral Component Interconnect (PCI) Local Bus Specification Revision 2.0, dated Apr. 30, 1993 ("the PCI Specification") published by the PCI Special Interest Group.

FIG. 2 shows a simplified block diagram representation of an implementation of a PCI bus. The PCI bus 204 forms a one-to-many connection between the CPU 200 and the peripheral components 202, which are located in the same chassis.

The PCI bus is installed on most new desktop computers. It transmits 32 bits at a time in a 124-pin connection (the extra pins are for power supply and grounding) and 64 bits in a 188-pin connection in an expanded implementation. PCI buses use all active paths to transmit both address and data signals, sending the address on one clock cycle and data on the next. Burst data can be sent starting with an address on the first cycle and a sequence of data transmissions on a certain number of successive cycles.

PCI buses are often used for three purposes. First, they can be used to expand the capabilities of a computer's motherboard. In this scenario expansion boards are inserted in slots on the motherboard that are connected to the PCI bus. The Central Processing Unit (CPU) of the motherboard can then access the circuitry of the expansion board. Second, the PCI bus can be used to add processing power to a computer system. In this scenario, the expansion boards that are inserted in the motherboard are equipped with at least one CPU. The PCI bus allows the CPU of the motherboard to communicate with the expansion CPU. Finally, it allows for a multi-CPU computer system, the PCI bus can be used by the CPUs to share resources such as memory devices.

The PCI bus has become widely implemented in computer systems. This is particularly true in the area of personal computers (PCs). This wide implementation implies that there are many components that are compliant with the PCI Specification. Computer systems that do not use these PCI compliant components are not as easy to implement.

There are some limitations of the PCI bus that while not being particularly troublesome for personal computers (PCs) are significant to industrial grade PCs used in more 'critical' applications. These limitations include: latencies created by the continually increasing amounts of data that can be produced by today's peripheral boards, bus reliability and susceptibility to 'single point' failures, and the ability to locate the peripheral boards in remote locations with respect to the system processor.

First, the issue of bus latency has become more of a concern as peripheral boards transmit larger amounts of data. In particular, multi-media devices that handle audio or visual data transmit large amounts of data that requires real time processing. During times when data is being transferred from such data intensive peripheral boards the other devices on the bus are idled. The resulting bus latency can create undesirable degradations in performance. In these cases the PCI bus becomes the 'bottleneck' in the computer. U.S. Pat. No. 5,682,484, issued on Oct. 28, 1997 to Lambrecht, discloses the use of a separate, dedicated, multi-media bus for data intensive devices. In one scenario control information is transmitted on the PCI bus while real time data is transferred on the multi-media bus. In an alternative embodiment a separate serial bus is used for control signals. Thus, the use of a serial bus for control signals and a multimedia bus is known.

Second, PCI buses do not provide high reliability communications. The PCI bus is a single electrical connection between the central processor and every peripheral board connected to the bus. It is a one-to-many communication bus i.e. one central processing unit to many peripheral boards. Both address and data signals are transmitted on the PCI bus, sending the address on one clock cycle and data on the next. If there is a malfunction on a peripheral board that impairs communication on the bus, the central processing unit will be prevented from communicating with every other peripheral board due to the common electrical connection. This type of bus failure is known as a 'single point' failure. Thus, a failure of an individual peripheral component can interrupt the communications between the system processor and other peripheral boards on the same PCI bus. Such a situation is quite undesirable in high reliability applications such as telephone switching. One approach for overcoming this problem is with the use of redundancy. The reliability requires a completely redundant system i.e. duplicate system processors, PCI buses and peripheral boards. The redundant system can be maintained as redundant or provide load sharing for the primary system. This solution consumes considerable space and is costly.

Finally, the speed of communications prescribed by the PCI Specification requires the use of a local bus. The maximum length of bus prescribed in the PCI Specification is several inches which prohibits communication with any peripheral boards that is in a remote location with respect to the central processor. U.S. Pat. No. 5,781,747 issued to Smith et. al. on Jul. 14, 1998, proposes a system for extending the distance over which communications can take place. Their proposal is schematically shown in FIG. 3. The CPU 300 and local peripheral components 302 are connected to a PCI bus 304. The patent uses "cables or other transmission medium" 308 to connect a remote PCI bus to which peripheral components 306 are attached. This method requires hardware and software to convert the communications signals from PCI protocols to those that can be used in the cable network. This must be performed at each end of the cable. While this system extends the physical range of communication using a PCI protocol it is still susceptible to the other problems associated with a PCI bus.

The above discussion of bus architecture should now be brought into the context of industrial computers. The grouping of industrial computers comprises both PC- compatible systems that are designed for industrial applications and more specialized passive-backplane computers. This latter group often use rack based architectures that follow the Eurocard form factor as outlined in the CompactPCI Specification (PICMG 2.0 Revision 2.20) dated Jun. 17, 1997. Industrial computers can contain many peripheral boards that generate large amounts of data e.g. audio and telephony applications. Further, industrial computers are often used in telecommunications applications where high reliability is required. For example, a so called 'carrier grade' system has an availability of at least 99.999%. This is a common reliability requirement in the telecommunications industry. All of these requirements make the PCI bus a less than optimal solution for communication between the system processor and peripheral boards or between peripheral boards of an industrial computer system.

Therefore, there is a need for a bus architecture that provides high reliability communication between system processor(s) and peripheral boards of an industrial computer system. The bus architecture should not be susceptible to single point failures. The bus architecture should also address the difficulties associated with large amounts of low latency data such as digitized voice and allow the peripheral boards to be located remotely from the system processor. Finally, the bus architecture should be implementable within standard industrial PCs. A bus architecture that addresses these points is therefore desirable. The current invention addresses the above points by the use of established telecommunications protocols and systems in a novel architecture for communications between the system processor and peripheral boards.

SUMMARY OF THE INVENTION

In one embodiment of the invention an industrial PC-compatible computer system for telecommunications applications is provided. The computer system includes a plurality of peripheral boards, each of which includes a peripheral processor. A computer telephony bus provides communications among the peripheral boards. The computer system also includes a plurality of system processors. A serial telecommunications bus arrangement provides communications between the plurality of peripheral boards and the plurality of system processors.

In another embodiment of the invention a bus architecture for providing communications in an industrial PC-compatible computer system, including: a plurality of peripheral boards, with each peripheral board including a peripheral processor, a plurality of system processors and a plurality of telecommunications hubs, for telecommunications applications is provided. The bus architecture includes a computer telephony bus for providing communications among the plurality of peripheral boards and a serial telecommunications bus arrangement for providing communications between the plurality of peripheral boards and the plurality of system processors.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

An overview of the invention is provided. The current invention outlines a bus architecture for PC-compatible industrial computers. This bus architecture is designed to provide high reliability communications without requiring redundancy for each peripheral board. A first bus provides for communications among peripheral boards and a second bus arrangement provides for communications between the system processors and peripheral boards.

Figure 1:
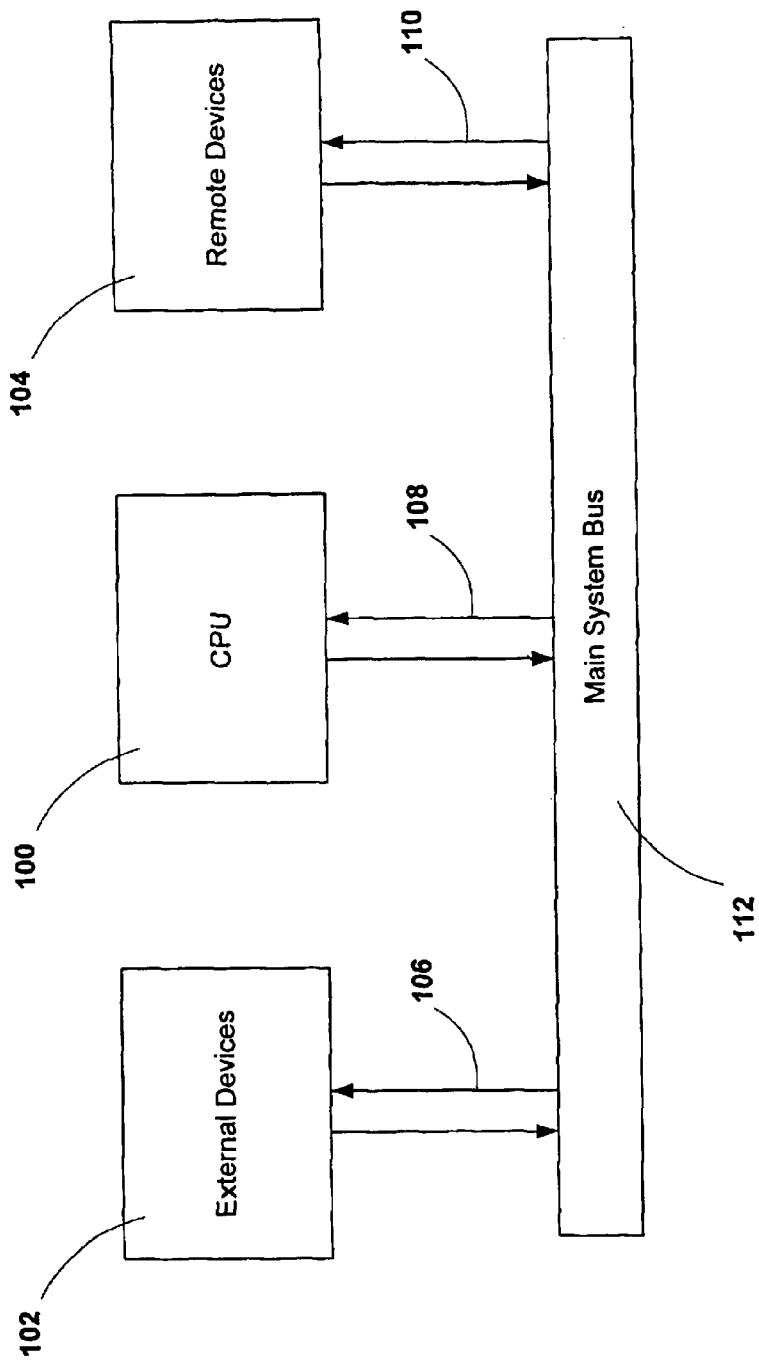
FIG. 1 is a block diagram representation of a multiple bus system of the prior art.
Figure 2:
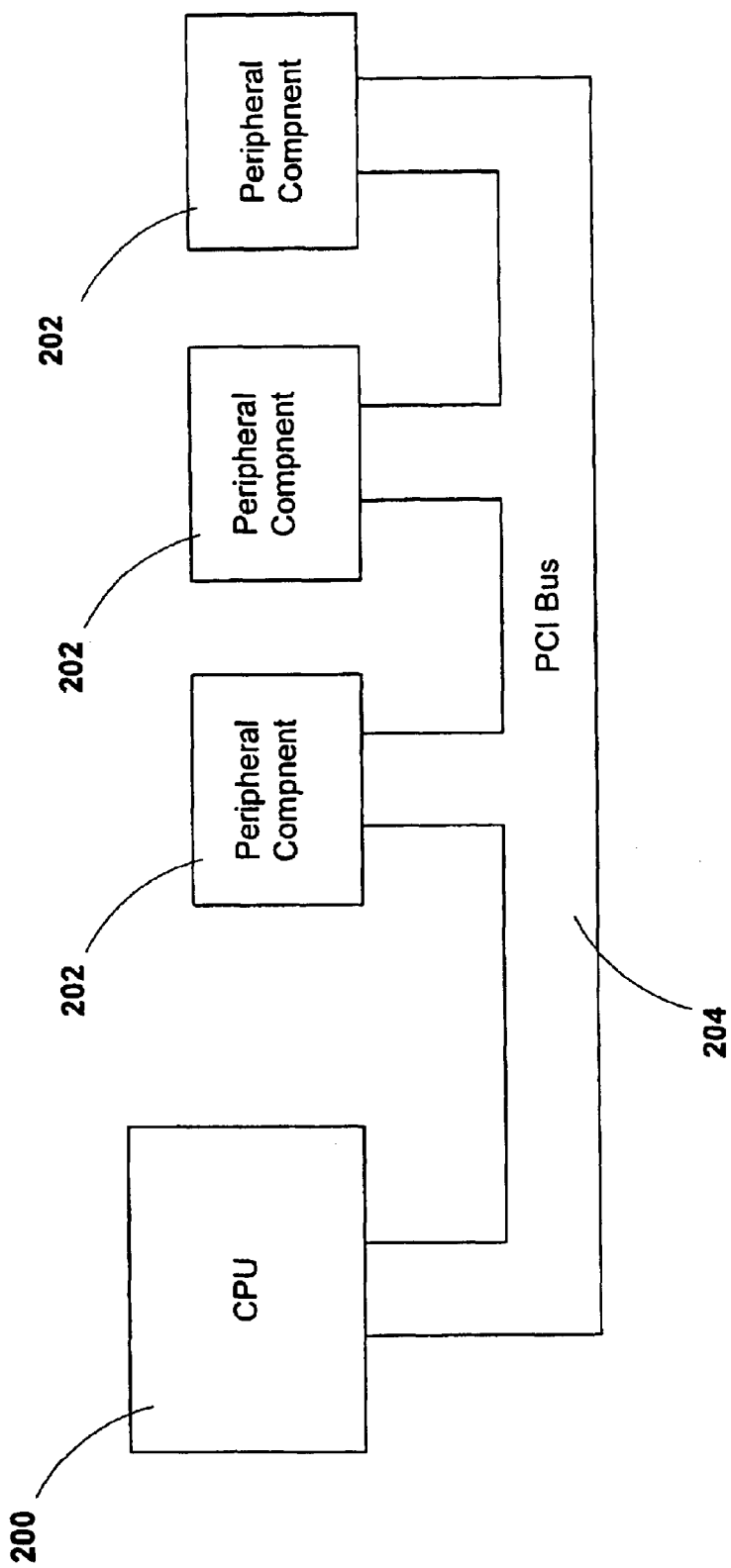
FIG. 2 is a block diagram of a typical PCI bus architecture of the prior art.
Figure 3:
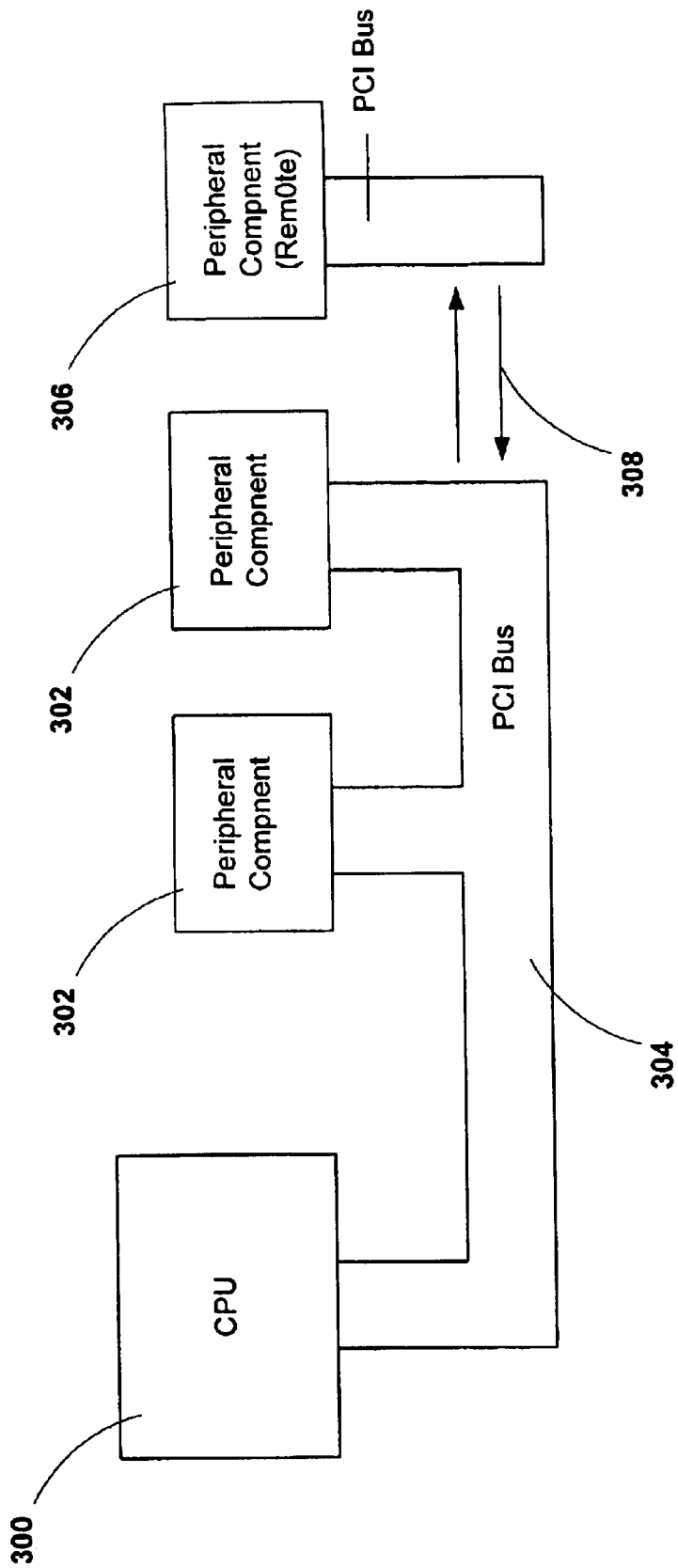
FIG. 3 is a block diagram of a bus system of the prior art that uses a telecommunications bus to extend the system bus to remote locations.
Figure 4:
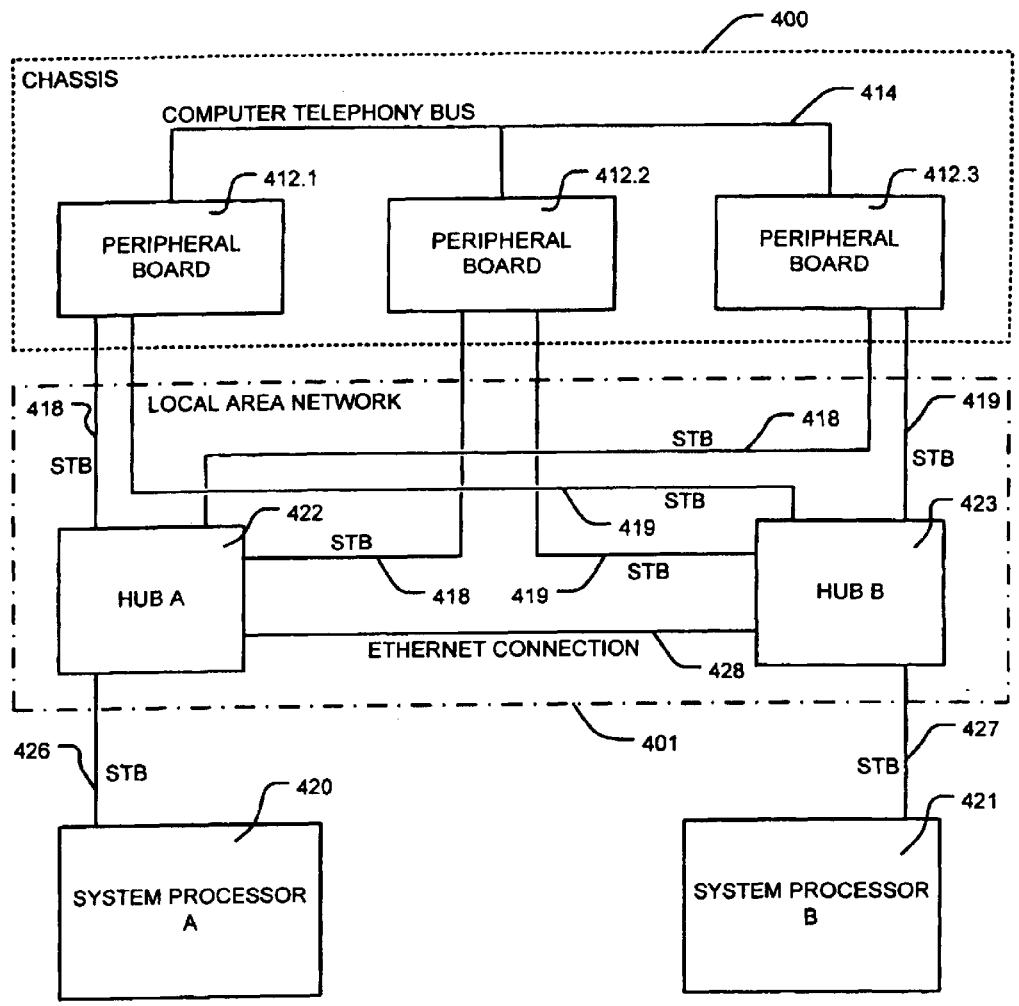
FIG. 4 is a block diagram of the bus system according to one embodiment of the current invention.

FIG. 4 is a block diagram of the PC-compatible industrial computer system according to one embodiment of the current invention. The chassis 400 of the industrial computer is outlined schematically by a dotted line. The peripheral boards 412.1, 412.2 and 412.3 and the bus 414 that provides communications among peripheral boards are located within the chassis. Bus 414 is a low latency Computer Telephony (CT) bus. The peripheral boards of the current embodiment comply with the CompactPCI Specification. Communications between the peripheral boards and the system processors are provided for by a serial telecommunications bus arrangement 401 that forms a Local Area Network.

A detailed description of the structure of the current embodiment is now provided. In the current embodiment bus 414 that provides for communications among peripheral boards 412.1, 412.2 and 412.3 is an H.110 Computer Telephony (CT) bus. H.110 buses are common in the art for providing low-latency communications between peripheral boards of an industrial computer. A further description is therefore deemed unnecessary for the purpose of describing the invention. If desired, however, reference can be made to: The Enterprise Computer Telephony Forum, H.110 Hardware Compatibility Specification: CT Bus revision 1.0, 1997.

The H.110 bus is a high density Time Division Multiplexed (TDM) bus, made of 32 serial data lines of up to 128 time slots of 64 Kbps each, for a total of up to 4096 time slots of 64 Kbps. As an example of its capabilities these timeslots can be used to simultaneously carry the digitized voice (64 Kbps) of 2048 telephone conversations between two parties between CompactPCI peripheral boards. The bus is implemented in connector location J4/P4 on a CompactPCI compliant peripheral board. The H.110 bus provides for a redundant clocking system and allows for 'hot swap' operations (the insertion and removal of cards while the card's slot is powered). Further, the H.110 specification has been implement in Integrated Circuits (ICs) by chip set manufacturers for easy implementation. In the current embodiment the H.110 bus has been implemented using Lucent's T8105 (Ambassador) Interface and Time-Slot Interchanger.

The H.110 bus is used by peripheral boards interfacing to telecommunication devices such as telephones, telephone lines or trunks, to transfer real-time data such as voice between these peripheral boards. For example, the H.110 bus could be used to establish a conversation between two telephones, A and B, which are being interfaced by two different peripheral boards, A and B, located in the same industrial computer chassis. Peripheral board A is responsible for digitizing the voice received from telephone A and for placing the resulting voice samples on a particular time slot of a particular data line of the H.110 bus. The same applies for peripheral component B, it is responsible for digitizing the voice received from telephone B and for placing the resulting voice samples on a particular time slot of a particular data line of the H.110 bus. The conversation is actually established when the system processor instructs peripheral component A to retrieve the voice samples of telephone B from the H.110 bus and to convert the samples into an analogue which is sent to telephone A. The situation is reversed for peripheral component B. A conversation is established since the user of telephone A can hear telephone B and the user of telephone B can hear telephone A.

Once again referring to FIG. 4, communications between peripheral boards 412.1, 412.2 and 412.3 and system processors 420 and 421 are provided for by a Local Area Network (LAN) of serial telecommunication buses 401. In the current embodiment the serial telecommunication buses are Ethernet buses. The peripheral boards 412.1, 412.2 and 412.3 are each connected to two telecommunications hubs, 422 and 423, by first serial telecommunication buses 418 and 419, respectively. Thus, there are two Ethernet networks connected to each peripheral board, forming a dual Ethernet LAN. The network hubs 422 and 423 are each connected to and associated with system processor 420 and 421 through a second serial telecommunication bus 426 and 427, respectively. Finally, there is a single Ethernet connection 428, third serial telecommunications bus, between the telecommunications hubs 422 and 423.

The industrial computer system of the current invention has two system processors; system processor A (420) and system processor B (421). In the current embodiment the processors are located remote from the computer chassis 400 containing the peripheral boards 412.1, 412.2 and 412.3. These processors provide, amongst other things, system functions for the peripheral boards. As mentioned in the previous example involving telephone systems the system processor that monitors and facilitates the operation of the peripheral boards. The use of two system processors in the current invention increases the reliability of communication between the system processors and the peripheral boards.

In the current embodiment system processor A (420) and system processor B (421) are running in parallel allowing either system processor to take control of the industrial computer in cases of component failure with minimal disruption to the operation of the computer. Only one of the system processors is in communication with the peripheral boards at any given time with the other system processor being maintained in "hot standby" mode. This scenario of operation will be apparent to those of skill in the art.

The Ethernet Local Area Network (LAN) of the current embodiment follows the IEEE 802.3 specification ("Local and Metropolitan Area Networks—Specific Requirements—Part 3: Carrier Sense Multiple Access with Collision Detection (CSMA/CD) Access Method and Physical Layer Specifications" i.e. so called Ethernet).

Figure 5:
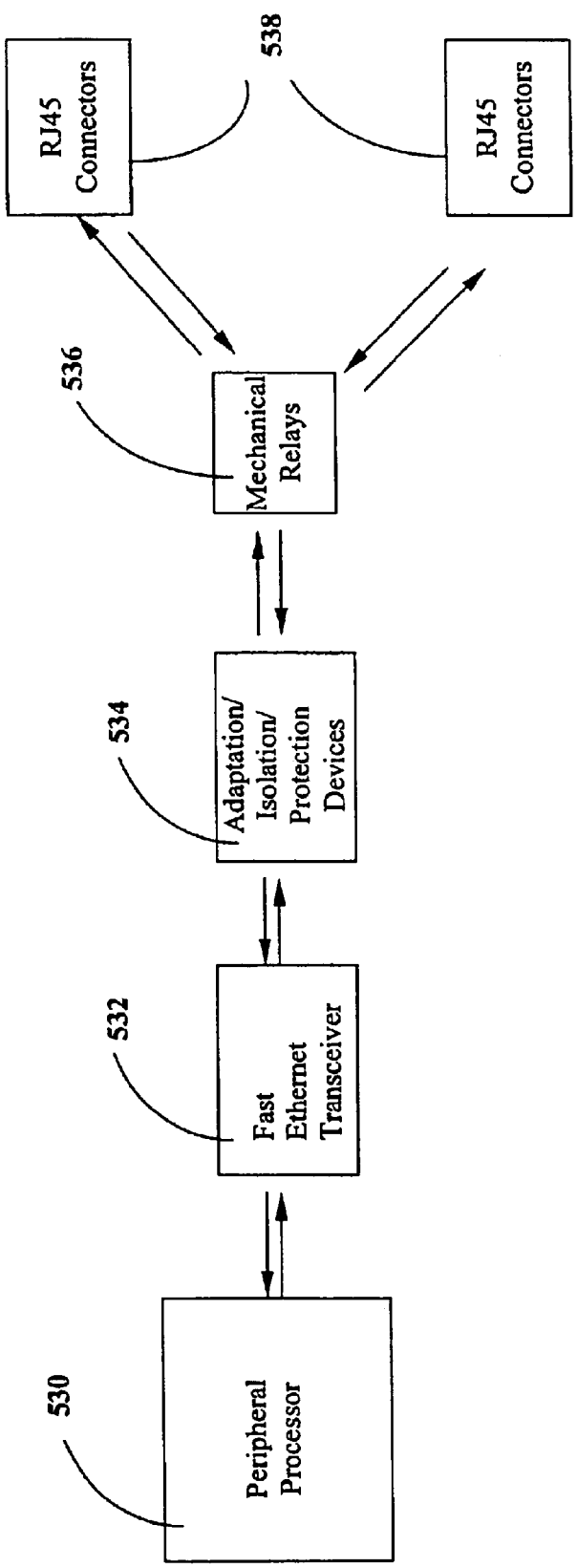
FIG. 5 is a block diagram of the circuitry on a peripheral board that provides the interface to the two Ethernet LAN hubs, according to one embodiment.

The peripheral boards are connected to the dual Ethernet LAN through interface circuitry. A schematic block diagram of this circuitry is shown in FIG. 5. The interface circuitry includes five main components: a microprocessor (peripheral processor) 530, a fast Ethernet transceiver 532, a signal adaptation isolation and protection IC 534, a pair of mechanical relays 536 and a pair of connectors 538.

The peripheral processor 530 in the preferred embodiment is a Motorola MPC860 PowerQUICC (PowerPC Quad Integrated Communications Controller). One of the roles of the peripheral processor is the provision of telephony network interface signalling. It is also involved in the fault detection procedures that are used to determine the integrity of communications and are outlined in the discussion of the operation of the bus.

The fast Ethernet transceiver 532 of the preferred embodiment is a Level One LXT970A which supports full-duplex operation at 10 and 100 Mbps. It provides a Media Independent Interface (MII) for easy attachment to the 10/100 Media Access Controller (MAC, also called Fast Ethernet Controller) of the MPC860 PowerQUICC. The signal adaptation isolation and protection IC (transformer or magnetic module) 534 is a Pulse PE-68517L. The Pulse PE-68517L is part of a line of 10/100Base-TX magnetics modules that have been specifically designed for the implementation of a 10Base-T and 100Base-TX transmission over data grade unshielded twisted pair cable (UTP-5). Finally, a pair of Aroma AGN2004H mechanical relays 536, which are suitable for switching of high-speed data links are used. The AGN2004H relays 436 are controlled by software running on the peripheral processor 530. These relays allow the peripheral processor 530 to select either of the Ethernet LANs for communications with the processor via connectors 538. The connectors are RJ45 connectors which are suitable for the unshielded twisted pair cable(UTP-5) used for the Ethernet buses.

A detailed description of the operation of the invention will now be provided. In accordance with the goal of providing high reliability communications within the computer system there are two parallel Ethernet LANs in the current invention.

The bus architecture of the current invention provides for a communication path between the peripheral boards and the system processors that has no single point of failure. That is, no single component, has the potential of failing and causing a system wide failure or of preventing the peripheral boards from communicating with at least one of the system processors.

For example, consider the case where the peripheral boards 412.1, 412.2 and 412.3 are in communication with system processor A (420) using first serial telecommunication bus 418, hub A (422) and second serial telecommunications bus 426. If any of first serial telecommunication buses 418 that connect the peripheral boards 412.1, 412.2 and 412.3 to hub A (422) fail, the peripheral board connected to the failed first serial telecommunications bus (418) may use its alternate first serial telecommunications bus (419) to communicate with system processor A (420) via hub B (423), third serial telecommunications bus 428 and second serial telecommunications bus 426. In the event that hub A (422) fails the peripheral boards would use first serial telecommunications bus 419 to communicate with system processor B (421) through hub B (423). In the case of a failure of hub B (423), the peripheral boards would use first serial telecommunications bus 418 to communicate with system processor A (420) through hub A (422). Finally, if second serial telecommunications bus 426 or system processor A (420) fails, the peripheral boards would communicate with system processor B (421) through either hub B (423) and second serial telecommunications bus 427 or third serial telecommunications bus 428. In a similar manner if second serial telecommunications bus 427 or if system processor B (421) failed, the peripheral boards would communicate with system processor A (420).

Third serial telecommunications bus 428 is provided so that under normal operations, the communications between the peripheral boards and one of the system processors is independent of the hub being used. This bus between hubs allows for simplified network control software. In case of a failure of this bus, peripheral boards are limited to using first serial telecommunications bus 418 and hub A (422) to communicate with system processor A (420) and first serial telecommunications bus 419 and hub B (423) to communicate with system processor B (421).

The above dual Ethernet LAN has numerous systems and protocols for switching between networks as outlined above should a failure occur along one of the networks between the peripheral boards and the system processors. The interface circuitry of each peripheral board periodically tests the network to determine the integrity of the Ethernet network being used by that peripheral board. If an error is detected in the network the peripheral board can be switched to the other network using the appropriate relays.

Figure 6:
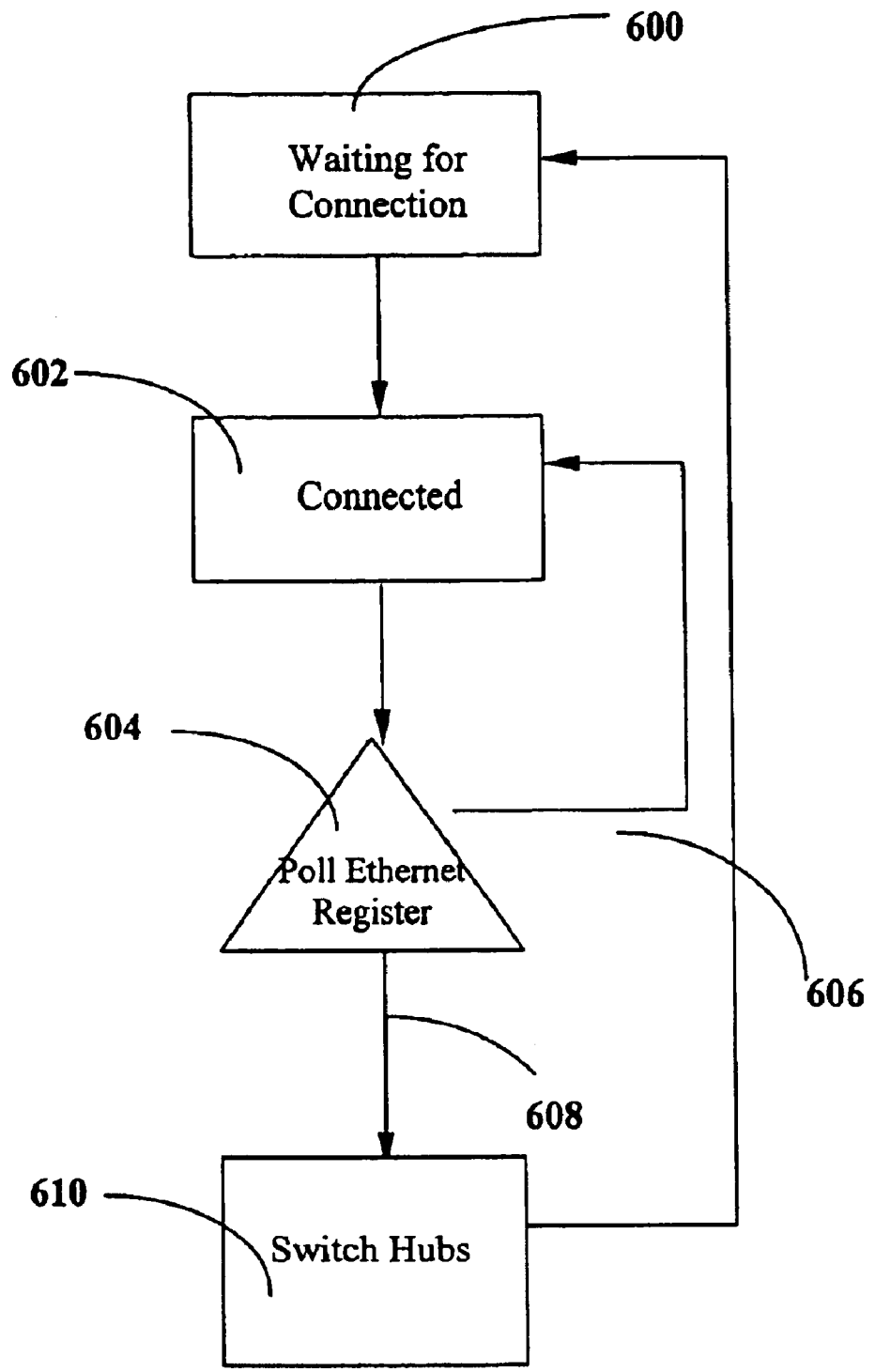
FIG. 6 is a block diagram of an embodiment depicting the sequence of events in the testing of Ethernet registers.

In one test the processor that is associated with the interface circuitry (peripheral processor) periodically polls its own Ethernet control registers to ensure the sanity of the link at the Ethernet level. FIG. 6 is a block diagram of this test procedure. Initially, the peripheral processor waits for a TCP/IP connection to be established with the system processor (state: waitingForConnection) 600. When the connection is established, the processor goes to the connected state 602 (state: connected). Once in the connected state, the processor periodically polls its own Ethernet registers 604 to verify if the Ethernet link is good. If the link is determined to be good 606 the system is maintained in the connected state. If the link is determined to be bad 608 the processor signals the Ethernet relays (536, FIG. 5) to switch communication hubs 610 such that communications are through the hub that was previously unused and the connection is re-established. It should be noted that Ethernet link failure detection only applies to one section of the Ethernet LAN (e.g. element 412 to 418 to 422 of FIG. 4).

Figure 7:
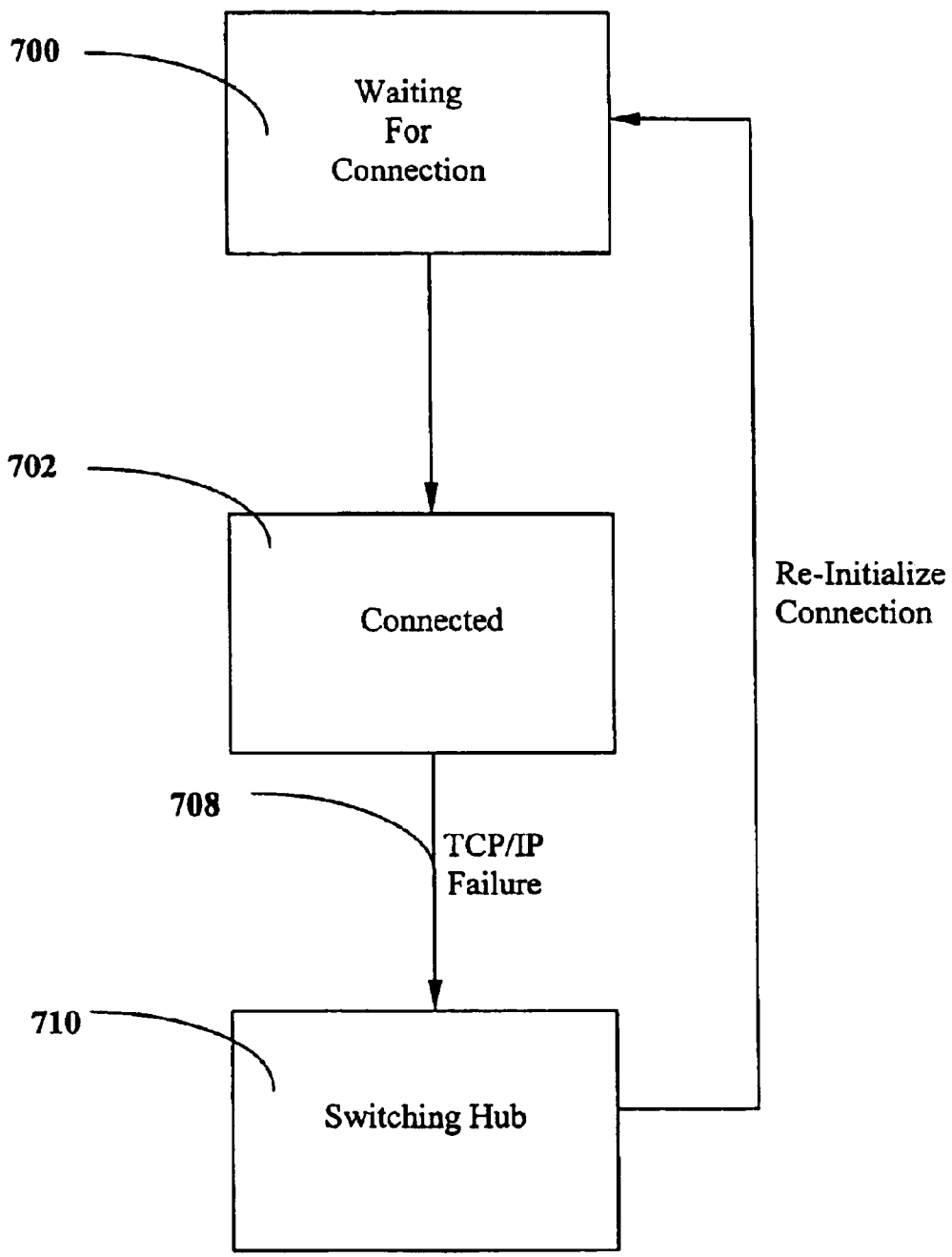
FIG. 7 is a block diagram of an embodiment depicting the sequence of events in the testing of the TCP/IP integrity.

It is also possible to detect a failure at the TCP/IP level. Each message transmission must be acknowledged, if a retransmission occurs. If retransmissions fail, a TCP/IP error is declared. The TCP/IP link test is more of end to end test (e.g. from peripheral board 412.1 to the system processor 420). The protocol for detecting such an event is shown in FIG. 7. When the system is operating in the connected state 702 the operating system of the peripheral processor is able to detect-TCP/IP failures 708. In the case of a failure the processor will instruct the relays to switch hubs 710 and the system is returned to the state: waiting for connection, 700.

Figure 8:
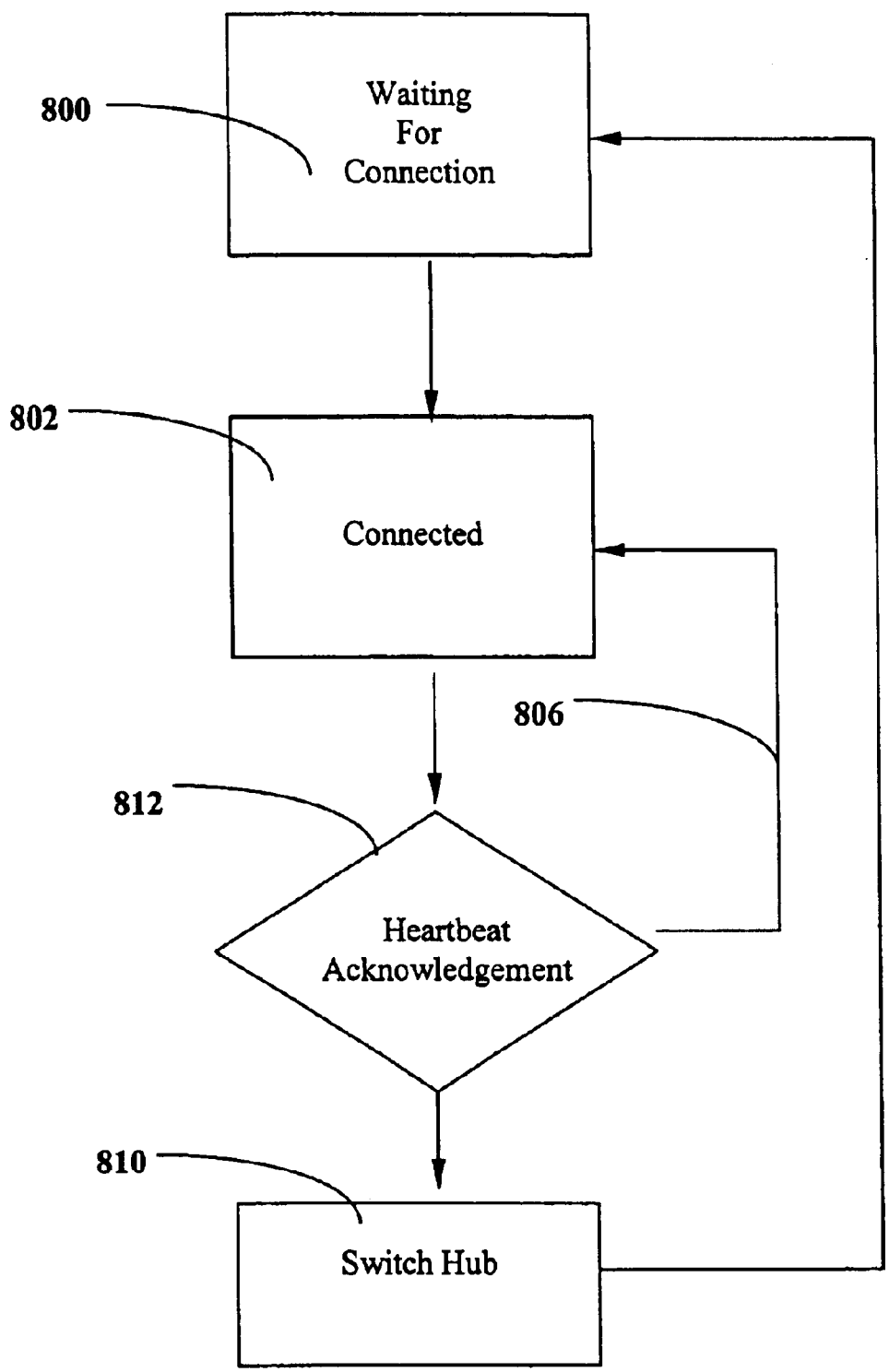
FIG. 8 is a block diagram of an embodiment depicting the sequence of events in a heartbeat failure test.

The final error that can be detected by the processor is a 'heartbeat' failure. The operation of this failure detection mechanism is shown schematically in FIG. 8. Since a TCP/IP failure will be detected only when the processor makes an attempt to communicate with the system processor, the heartbeat message provides for a means of quickly detecting failures. This is even true at times of low message traffic between the peripheral processor and the system processor. Once a TCP/IP connection has been established 802 the peripheral processor periodically sends out a short burst of data or 'heartbeat message' 812 which must be acknowledged by the system processor (420 or 421 of FIG. 4), to verify the status of communications with the system processor (state: waitingHeartbeatAck). If this message is acknowledged within a specified time interval the peripheral processor returns the system to the connected state 806. If the timer expires without receiving an Heartbeat acknowledgement from the system processor, the peripheral processor will switch hubs (state: switchingHub) 810 using the relays 536 of FIG. 5 and the system is returned to the state: waiting for connection, 800.

A description of the structure and operation of various embodiments of the invention is now provided. First, it would be apparent to one skilled in the art that the components used in the current embodiment are specific to that embodiment. Other components which perform similar functions to those of the current embodiment could be used in other embodiments which are also encompassed by this invention.

Second, in an alternative embodiment of the invention the system processors would be located within the same computer chassis as the peripheral boards. Therefore the invention encompasses PCs that both comply with and do not comply with the CompactPCI Specification.

Third, the Ethernet network could alternatively use either the 100 Mbps Fast Ethernet system (IEEE 802.3u) or the Gigabit Ethernet system (IEEE 802.3z).

Fourth, it is also possible to provide other network architectures for achieving the same high reliability. For example, a redundant Ethernet router could be used instead of the two Ethernet hubs. It would also be possible to use a fibre loop with FDDI.

FDDI is a standard for data transmission on fibre optic lines in a local area network that can extend in range up to 200 km (124 miles). The FDDI protocol is based on the token ring protocol. In addition to being large geographically, an FDDI local area network can support thousands of users.

An FDDI network contains two token rings, one for possible backup in case the primary ring fails. The primary ring offers up to 100 Mbps capacity. If the secondary ring is not needed for backup, it can also carry data, extending capacity to 200 Mbps. The single ring can extend the maximum distance; a dual ring can extend 100 km (62 miles).

Finally, the system presented in the preferred embodiment contained three peripheral boards, two telecommunications hubs and two system processors. The current invention is not limited to this particular configuration. Rather the invention encompasses two or more peripheral boards, two or more telecommunications hubs and two or more system processors. The invention relates to the architecture of the bus is not limited to a specific number of peripheral boards, hubs and system processors.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. An industrial PC-compatible computer system for telecommunications applications, the computer system comprising:
    a plurality of peripheral boards, each peripheral board comprising a peripheral processor;
    a computer telephony bus for providing communications among the peripheral boards;
    a plurality of system processors; and
    a serial telecommunications bus arrangement for providing communications between the plurality of peripheral boards and the plurality of system processors, having:
        a plurality of telecommunications hubs, each hub being associated with a system processor;
        a first serial telecommunications bus operably connected to each peripheral board and each telecommunications hub for providing communications therebetween; and
        a second serial telecommunications bus operably connected to a telecommunications hub and its associated system processor for providing communications therebetween.

2. A computer system according to claim 1 the serial telecommunications bus arrangement further comprising a third serial telecommunications bus operably connected to a telecommunications hub and every other telecommunications hub for providing communications therebetween.

3. The computer system according to claim 1 wherein the computer system complies with the Compact PCI Specification.

4. The computer system according to claim 1 further comprising a chassis for containment of the peripheral boards.

5. The computer system according to claim 4 wherein the chassis also contains the system processors.

6. The computer system according to claim 1 wherein the computer telephony bus is an H.110 bus.

7. The computer system according to claim 1 wherein the serial telecommunications bus arrangement comprises Ethernet buses.

8. An industrial PC-compatible computer system for telecommunications applications, the computer system comprising:
    a plurality of peripheral boards, each peripheral board including a peripheral processor;
    an H.110 bus for providing communications among the peripheral boards;
    a plurality of system processors;
    a plurality of telecommunications hubs, each hub being associated with a system processor;
    a first Ethernet bus operably connected to each peripheral board and each telecommunications hub for providing communications therebetween;
    a second Ethernet bus operably connected to a telecommunications hub and its associated system processor for providing communications therebetween; and
    a third Ethernet bus operably connected to a telecommunications hub and every other telecommunications hub for providing communications therebetween.

9. The computer according to claim 8 wherein the Ethernet bus follows the IEEE802.3X specification.

10. A bus architecture for providing communications in an industrial PC-compatible computer system for telecommunications applications, the computer system comprising a plurality of peripheral boards, each peripheral board comprising a peripheral processor, and a plurality of system processors, each of which has a telecommunications hub associated with it, the bus architecture comprising:
    a computer telephony bus for providing communications among the plurality of peripheral boards; and
    a serial telecommunications bus arrangement for providing
        communications between the plurality of peripheral boards and the plurality of system processors, having:
            a first serial telecommunications bus for providing communications between each of the peripheral boards and each of the telecommunications hubs; and
            a second serial telecommunications bus for providing communications between each of the system processors and its associated hub.

11. A bus architecture according to claim 10 wherein the serial telecommunications bus arrangement further comprises a third serial
    telecommunications bus between each of the telecommunications hubs and every other telecommunication hub.

12. A bus architecture according to claim 10 wherein the computer telephony bus is an H.100 bus.

13. A bus architecture according to claim 10 wherein the serial telecommunications bus is an Ethernet bus.

14. The bus architecture according to claim 13 wherein the Ethernet bus follows the IEEE802.3X protocol.

* * * * *